United States Patent [19]

Stanuszek

[11] 4,114,378
[45] Sep. 19, 1978

[54] ROD AND PISTON CONNECTION FOR HYDRAULIC DEVICES

[75] Inventor: Dennis M. Stanuszek, Owosso, Mich.

[73] Assignee: Midland-Ross Corporation, Cleveland, Ohio

[21] Appl. No.: 734,035

[22] Filed: Oct. 20, 1976

[51] Int. Cl.² ............................................. F15B 7/08
[52] U.S. Cl. ...................................... 60/589; 91/422; 92/129
[58] Field of Search ............ 403/353, 360, 381; 92/129; 91/369 B, 422, 222; 60/589, 592; 251/357

[56] References Cited

U.S. PATENT DOCUMENTS

| 2,246,141 | 6/1941  | Main ........................... 60/589 |
| 2,654,560 | 10/1953 | Smith ...................... 251/357 X |
| 3,002,466 | 10/1961 | Read ....................... 403/353 X |
| 3,174,286 | 3/1965  | Erickson ................... 60/589 |
| 3,542,408 | 11/1970 | Lowrey ..................... 403/353 |
| 3,564,978 | 2/1971  | Flitz .......................... 92/187 |

FOREIGN PATENT DOCUMENTS

| 229,915 | 8/1960 | Australia ................... 60/589 |
| 219,471 | 5/1942 | Switzerland ............... 92/129 |

*Primary Examiner*—Irwin C. Cohen
*Attorney, Agent, or Firm*—H. Duane Switzer

[57] ABSTRACT

A hydraulic device includes a rod connected with a piston for limited axial movement relative thereto for opening a passage through the piston while pulling on same and closing the passage while pushing on same. The rod and piston are connected by a separable coupling including cooperating coupling parts formed integrally on the rod and piston for connecting and disconnecting the rod and piston by relative lateral movement therebetween.

1 Claim, 3 Drawing Figures

ROD AND PISTON CONNECTION FOR HYDRAULIC DEVICES

BACKGROUND OF THE INVENTION

This application relates to the art of hydraulic devices and, more particularly, to connections between rods and pistons in hydraulic devices. The invention is particularly applicable for use in connecting a push rod to a slave piston in a vehicle brake booster mechanism and will be particularly described with reference thereto. However, it will be appreciated that the invention has broader aspects and may be used in other hydraulic devices.

One form of vehicle power brake commonly includes a slave hydraulic cylinder connected with a vacuum booster. The slave hydraulic cylinder includes a piston connected with a push rod to which force is applied by the vacuum booster. The connection between the piston and the push rod also serves as a valve for selectively opening or closing a passage through the piston depending upon whether the piston is being pulled by the rod or being pushed thereby. The rod is commonly connected with the piston for limited axial movement as by a pin extending through holes in the piston or rod, and axial slots in the other member. An arrangement of this type requiring the use of separate fasteners makes the connection relatively expensive to manufacture and assemble. Relatively close tolerances in boring the holes and slots is necessary to insure proper operation of the valve.

It would be desirable to have an arrangement for connecting the rod to the piston without requiring the use of any movable parts or separate fasteners.

SUMMARY OF THE INVENTION

A hydraulic device of the type described has the rod and piston connected by a separable coupling which includes cooperating coupling parts formed integrally on the rod and piston for connecting and disconnecting the rod and piston by relative lateral movement therebetween. The separable coupling has no moving parts and no fasteners separate from the rod and piston. The coupling requires no swaging or other deformation of metal in order to make the connection.

In one arrangement, the coupling parts include an enlargement on an end portion of the rod and a laterally open pocket on the piston for receiving the enlargement.

The rod is closely guided in a bore and the piston is reciprocable in a cylinder so that the separable coupling cannot be connected or disconnected while the piston is in the cylinder. This is because lateral movement of the piston and rod cannot take place relative to one another. The rod has a length greater than the length of the cylinder so that the piston can be connected or disconnected outside of the cylinder.

The end of the rod which faces the piston includes an elastomeric valve seal carried thereby. The rod includes integral retaining means for retaining the valve seal thereon. In one arrangement, the retaining means is defined by a bore in the rod end which faces the piston. The bore has an entrance opening of smaller diameter than the diameter of the bore inwardly of the end face. The valve seal is received in the bore and has a seal projection extending through the opening to the bore.

It is a principal object of the present invention to provide an improved slave hydraulic cylinder.

It is a further object of the invention to provide an improved connection between a piston and rod in a hydraulic device.

It is also an object of the invention to provide a connection between a piston and cylinder which requires no moving parts or separate fasteners, and is formed integral with the rod and piston.

DESCRIPTION OF A PREFERRED EMBODIMENT

Figure 1:
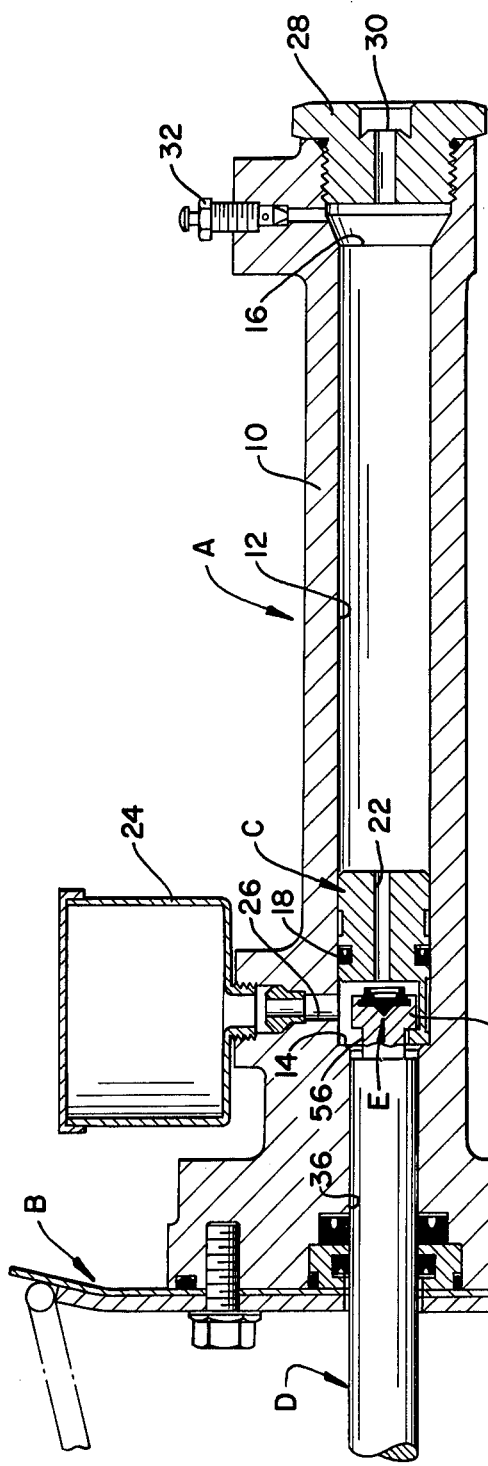
FIG. 1 is a side cross-sectional elevational view of a slave hydraulic cylinder having the improvement of the present invention incorporated therein.

With reference to the drawing, FIG. 1 shows a slave hydraulic cylinder A connected with a vacuum booster B of any suitable type including those disclosed in U.S. Pat. No. 3,013,535 issued Dec. 19, 1961, to Schultz and entitled Brake Booster Mechanism, or U.S. Pat. No. 3,628,422 issued Dec. 21, 1971, to Acre and entitled Power Brake Reaction Mechanism.

Cylinder A includes a housing 10 having an elongated cylindrical bore 12 therein with first and second opposite ends respectively indicated generally at 14 and 16. A piston C is received in bore 12 for reciprocation, and divides the cylinder into first and second chambers on opposite sides thereof. The first chamber is on the side of piston C facing first end 14, while the second chamber is on the side of piston C facing end 16. Piston C has a circumferential groove receiving a seal 18 which sealingly engages the wall of bore 12. A centrally located axial hole through piston C defines a passage 22 for establishing communication of the first and second chambers past piston C.

A hydraulic fluid reservoir 24 communicates with the first cylinder chamber through a port 26. The port 26 may also be described as being located between first cylinder end 14 and piston C. Outwardly of second cylinder end 16, housing 10 threadedly receives a plug 28 having a central hole 30 therethrough for connection with conduits leading to wheel cylinders which operate brakes on a vehicle. A bleed valve 32 is provided for bleeding air from the system in a conventional manner.

An elongated cylindrical rod D is attached to vacuum booster B for longitudinal movement therewith to apply pushing and pulling forces to piston C. Rod D is closely guided in a cylindrical bore 36 in housing 10 and has an end portion connected with piston C by connecting means in the form of a separable coupling having coupling parts formed integral with piston C and rod D.

Figure 3:
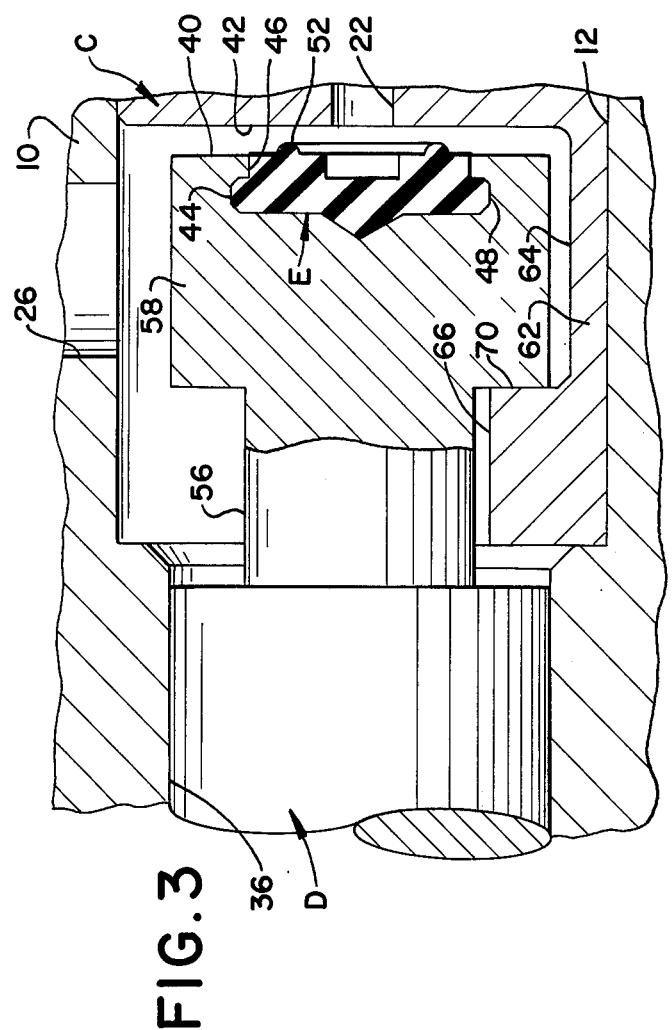
FIG. 3 is an enlarged cross-sectional elevational view of a connection between a rod and piston.

As best shown in FIG. 3, rod D has one generally flat end 40 facing one flat end 42 of piston C. A cylindrical bore 44 spaced inwardly from rod end 40 has a circular entrance opening 46 of smaller diameter than bore 44. This provides a circumferential groove or the like spaced inwardly from rod end 40 for receiving a circular peripheral portion 48 of an elastomeric valve seal E having a circular projection 52 extending outwardly from rod end 40 through opening 46 for engaging piston end 42 outwardly of passage 22. Elastomeric valve seal E can simply be pressed through opening 46 into bore 44 so that no additional fasteners are required. This mounting arrangement for valve seal E provides an integral retaining means on rod D for retaining valve seal E thereto without the need for separate fasteners or the like.

A circumferential groove 56 is formed in rod D inwardly from rod end 40 to define a generally cylindrical enlargement 58 on the end portion of rod D. Enlargement 58 is simply a cylindrical end portion of rod D separated from the main length thereof by circumferential groove 56. This is referred to as an enlargement simply for purposes of convenience and it will be recognized that the diameter of enlargement 58 is actually the same as the remainder of rod D. However, it will be recognized that enlargement 58 could be larger or smaller in size as compared to the major length of rod D.

Figure 2:
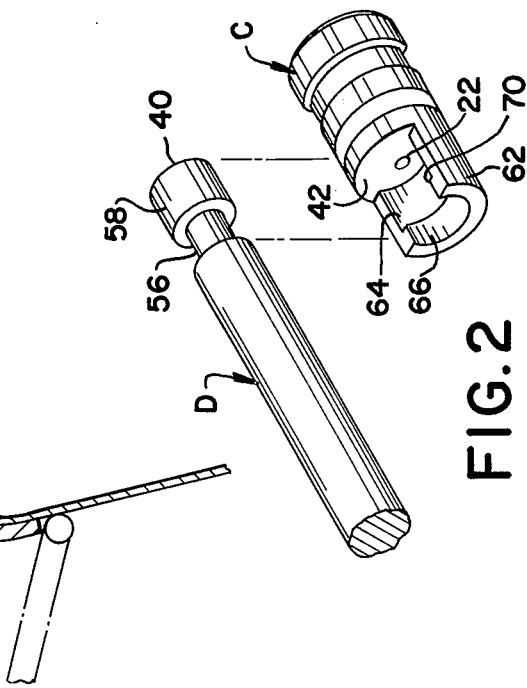
FIG. 2 is a perspective illustration of a portion of a rod and a piston.

As best shown in FIGS. 2 and 3, piston C has an extension 62 extending generally axially from piston end 42. Extension 62 includes a first pocket 64 adjacent piston end 42 and a second pocket 66 of smaller size than first pocket 64 to provide a generally radially extending arcuate shoulder 70 between pockets 64 and 66. Both pockets 64 and 66 are laterally open. Pocket 64 has an arcuate inner surface of generally the same curvature as enlargement 58 and may be of slightly larger size. Second pocket 66 is of generally the same curvature as the bottom of circumferential groove 56 and may be slightly larger. Arcuate pockets 64 and 66 extend over arcs not greater than 180° so that enlargement 58 and groove 56 are freely receivable laterally in pockets 64 and 66 respectively. Pocket 64 has a length between shoulder 70 and piston end 42 which is slightly longer than the length of enlargement 58. The length of pocket 66 from shoulder 70 to the end of extension 62 is substantially less than the axial length of circumferential groove 56 and rod D.

Cylinder bore 12 may be considered as having a predetermined length between its opposite ends 14 and 16. With plug 28 removed from cylinder housing 10, rod D has a length sufficient to extend outwardly of cylinder housing 10 from the end thereof which receives plug 28. Piston C can then be attached to the end portion of rod D by relative lateral movement between the rod and piston for reception of the rod enlargement within the piston pocket. The rod and piston can then be retracted within bore 12 and plug 28 inserted. The connecting means between the rod and piston is in the form of a separable coupling formed by coupling parts integral with rod D and piston C. The coupling provides limited relative axial movement between rod D and piston C, and requires no moving parts or any fasteners separate from the rod and piston.

The normal position of the parts is shown in FIG. 3 with the end of piston extension 62 bottomed against end 14 of cylinder bore 12. Rod D is in a retracted position with vacuum booster B as is piston C. Valve seal projection 52 is spaced from piston end 42 so that there is communication through passage 22 between the chambers defined on opposite sides of piston C. When vacuum booster B is energized for applying a braking force to the vehicle wheels, a pushing force is applied to rod D which then moves axially relative to piston C so that valve seal projection 52 engages piston end 42 to close passage 22 and move piston C axially to the right in FIGS. 1 and 3 so that force is transmitted through the hydraulic fluid to the wheel cylinders. When the vacuum booster is de-energized, rod D is pulled back so it occupies the position shown in FIG. 3 with one end of enlargement 58 engaging shoulder 70 on extension 62. This pulls piston C back in a direction to the left in FIG. 1 and valve seal E is also out of engagement with piston end 42 so that hydraulic fluid is free to flow from the first chamber through passage 22 to the expanding second chamber on the right side of piston C as the piston moves to the left.

The described separable coupling between the piston and rod requires absolutely no separate fasteners or any metal deformation to make the connection. The coupling parts are integral with the rod and piston so no attachment of separate coupling parts to these members is required. The separable coupling also employs no moving parts so it is very simple and reliable. A simple lateral relative movement between the piston and rod is required for connecting or disconnecting the parts. Enlargement 58 may be considered a rod abutment which is freely laterally receivable in a piston pocket to provide limited relative axial movement between the two parts for selectively opening and closing the valve formed between piston end 42 and elastomeric valve seal E. The axial length of first pocket 64 in piston extension 62 is sufficiently greater than the length of abutment or enlargement 58 to allow the necessary relative axial movement for opening and closing the valve by movement of valve seal E into and out of engagement with piston end 42. Likewise, the axial length of second pocket 66 is sufficiently smaller than the axial length of circumferential groove 56 to allow this relative axial movement of the rod and piston to effect opening and closing of the valve when pulling and pushing forces are applied to the rod.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. In a hydraulic device including a cylinder reciprocatingly receiving a piston separating said cylinder into first and second chambers, an axially extending passage through said piston for establishing communication between said chambers, a hydraulic fluid supply port communicating with said first chamber between one end of said cylinder and said piston, a push rod extending through said one end of said cylinder and being connected with said piston by lost motion connecting means for providing limited axial movement of said rod relative to said piston, said connecting means having no moving parts or fasteners separate from said rod and piston and including cooperating separable coupling parts formed integrally on said rod and piston for connecting and disconnecting said rod and piston by relative lateral movement therebetween, said coupling parts being formed integrally on said rod and piston in the sense of being unitary and whole therewith as opposed to being made separately therefrom and then secured thereto, said coupling part on said rod comprising an enlargement defined on one end portion thereof between a terminal rod end facing said piston and a circumferential groove spaced from said rod end, said coupling part on said piston including a laterally open arcuate first pocket for closely receiving said enlargement and a laterally open arcuate second pocket axially aligned with said first pocket for closely receiving said groove, said pockets being separated by a radially extending shoulder, said first pocket having an axial length slightly greater than said enlargement and said second pocket having a length less than said groove so that said enlargement moves axially relative to said first pocket between said shoulder and one end of said piston, said rod end facing said piston having a bore therein with an entrance opening of smaller diameter than the diameter of said bore inwardly of said rod end, an elastomeric valve seal received in said bore and having a seal projection extending through said entrance opening outwardly of said rod end, said cylinder having a cylinder bore communicating with one end thereof, said rod being closely guided in said cylinder bore so that said separable coupling parts cannot be connected or disconnected while said piston is in said cylinder, said cylinder having a predetermined length and a removable plug at the opposite end thereof from said cylinder bore, and said rod having a length greater than said predetermined length for location of said separable coupling parts on said piston and rod outside of said cylinder beyond said opposite end thereof to connect or disconnect said coupling.

* * * * *